Patented July 5, 1949

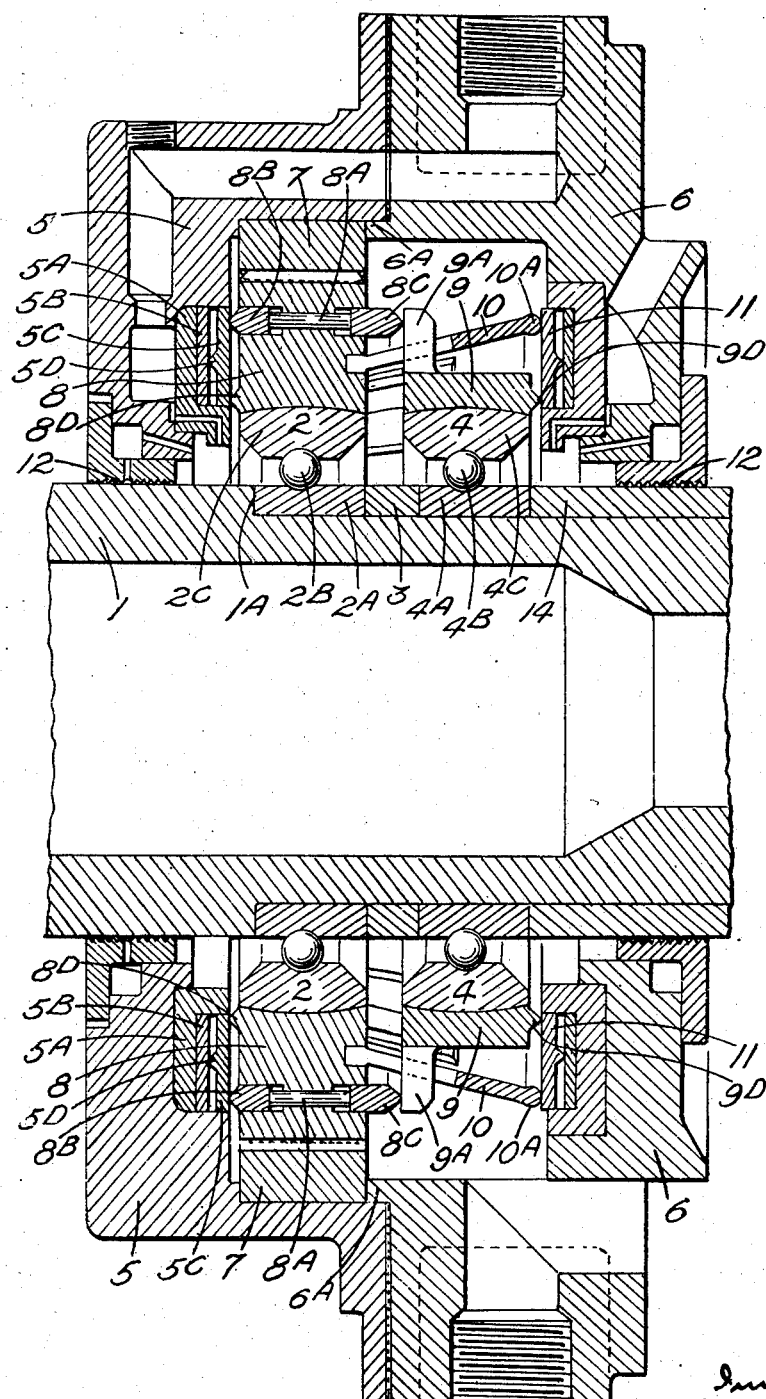

2,475,509

UNITED STATES PATENT OFFICE 2,475,509

BALL OR EQUIVALENT THRUST BEARING

Roderick Cristall McLeod, Cropston, England, assignor to Power Jets (Research & Development) Limited, London, England Application November 15, 1945, Serial No. 628,755
In Great Britain June 10, 1943

Section 1, Public Law 690, August 8, 1946
Patent expires June 10, 1963

14 Claims. (Cl. 308—233)

This invention relates to ball or like bearings. It has as its main object the provision of an arrangement and construction particularly applicable to bearings required to take axial thrust loads as well as journal loads. Whilst it is mainly concerned with ball bearings, it is conceivably also applicable to conical roller or like types of bearing, but following its main application it is proposed to describe the invention as applied to ball bearings only, the term being deemed to include such other similarly operating types.

It is well known that ball bearings can be made so that they are adapted to deal satisfactorily with axial thrust loads as well as journal loads, but in some applications it is not practicable for a single row bearing to be employed because, whilst speed and other factors control the size, it may be that the anticipated thrust load would be too high for the single row to deal with; the invention affords means whereby double or multiple rows of balls may be used as thrust bearings, the rows sharing the duty.

It has been previously proposed to construct a double ball thrust bearing in which the loads were intended to be balanced to some degree by virtue of being transmitted between the respective bearings and an abutment through a resilient medium.

According to this invention, a thrust bearing arrangement comprises two functionally independent ball bearings each arranged to transmit thrust, and substantially rigid means to which such bearings transmit their respective thrust loads, which means are adapted to balance these loads against each other whilst reacting against the element to which the sum of the loads is to be transmitted. In stating that the bearings are functionally independent, it is intended to be implied that each is a complete bearing capable of functioning by itself irrespective of the other; indeed, as will be seen, in a typical example one bearing functions only as a thrust bearing whilst the other does duty as a journal bearing also. Further, according to the invention a thrust bearing arrangement may comprise two functionally independent ball bearings each arranged to transmit thrust, and means associated with each bearing to transmit its respective thrust load across the axial span occupied by the other bearing to a lever system to which the other bearing also transmits its thrust load, and the lever system is so arranged and adapted as to balance the two loads so applied and transmit their sum to the element which is to react the total thrust, e. g. to a stationary bearing housing forming part of a machine; this case of the invention is applied where thrust in both axial senses of direction is to be borne.

The invention includes arrangements which comprise two functionally independent ball bearings mounted adjacently upon a shaft (or the equivalent of a shaft) by their inner races, the outer races of each having or being associated with means for transmitting thrust load in either axial sense to rockable means arranged to balance the loads from each bearing against the load from the other bearing and to transmit the sum of such loads to an element which is to react the total thrust.

One of the bearings is preferably arranged and mounted so as to act as a journal bearing; and preferably this bearing has its outer race supported through an axial spline arrangement allowing it axial freedom whilst restraining it radially and rotationally, whilst the outer race of the other bearing is restrained rotationally, conveniently by the means by which it transmits its thrust load in one axial sense.

The invention includes constructional features, including the mounting of the two bearings on a shaft, the bearings lying axially between two oppositely reacting sets of balancing means, the non-rotating elements of each bearing transmitting loads in one axial sense directly to its neighbouring balancing means (i. e. that to which it lies adjacent) and transmits loads in the other sense through the medium of intermediate means which axially span the alternative bearing.

If the bearings, as is preferred, have their outer races supported through partly-spherical surfaces within support rings, the latter are for purposes of description to be regarded as non-rotating elements of the bearings.

The balancing means preferably consist of annular series of rockable elements or levers each element being rockable about an axis which is positioned tangentially to an imaginary circle centred on the bearing axis. In preferred constructions therefore, a thrust bearing arrangement may comprise ball bearings mounted between two annular series of rocking elements spaced axially to accommodate the bearings, and the outer race of each bearing transmits thrust load in one sense to the radially outer parts of the balancing elements remote from such bearing through intermediate means which axially span the alternate bearing, whilst each outer race transmits thrust load in the alternative axial sense directly to the radially inner parts of its proximate balancing elements, the rocking axes of the elements being disposed radially between their outer and inner parts.

In cases where one bearing is mounted to function as a journal bearing, the other bearing may have its associated thrust load transmitting means in the form of rods or equivalent separated elements which are axially slideably mounted in the non-rotating part (including supporting part) of the journal bearing.

The accompanying drawing illustrates one form of the invention, in which it is applied to a double ball bearing adapted to act both as a journal and double acting thrust bearing. The drawing is a sectional arrangement, showing some surrounding parts so far as these help the description. The particular application is to part of the shaft of a gas-turbine engine in which high speed is to be catered for so that large diameter bearings are unsuitable, and the diameter which is practicable from the speed point of view is too small to withstand the axial loads. In the described case, axial load in either directional sense can be met.

The shaft is seen at 1 as a hollow shaft with a step formed externally at 1A, against which abuts the inner race 2A of a bearing assembly which has balls 2B and outer race 2C. Fitting on the shaft 1 behind the race 2A is a spacing collar 3, and the inner race 4A of the second bearing assembly which has balls 4B and outer race 4C. For brevity it may as well to refer to the forward bearing assembly 2A, 2B, 2C, as bearing 2 and the rearward bearing assembly 4A, 4B, 4C as bearing 4.

Surrounding the shaft and bearing arrangements, is a bearing housing, which comprises in fact part of the structure of the machine as a whole, and constitutes supporting means which is to react thrust from the shaft 1. This housing is shown as a forward shell 5 and a rear shell 6, these being held together by means not shown, and mutually locating by a shallow spigot 6A fitting into a suitable formation of shell 5.

Within the shell 5 an internally splined ring 7 is secured and this supports a bearing support ring 8 which is externally splined to engage 7, and is axially drilled with a circular series of holes in which lie slidable rods 8A. The holes interconnect channels on both flanks of the support ring 8, and in these channels lie rings 8B, 8C the interior edges of which bear on the ends of the rods 8A. Instead of rings 8B, 8C, series of arcuate sections of rings may be employed, corresponding to the number of rods 8A. The interior of the support ring 8 is formed with partly spherical contour, to correspond with the spherically-formed outer surface of the track 2C, in the manner well-known for self-aligning bearings. The support ring 8 also has a circular rib, or preferably a series of straight ribs, 8D, formed on one flank. The outer projecting edges of the rings 8B, 8C, are formed with rounded noses or knife-edges (as also the rib 8D) to afford as nearly as possible line contact.

The shell 5, through an inset annular intermediate part 5A, supports a hard steel annular ring 5B in a channel or recess, and loosely mounted also therein is a series of rocking plates 5C with bearing-ribs 5D which bear on the ring 5B so that each plate 5C can rock. The ring 8B bears on the plates 5C with leverage, that is to say to one side of rib 5D, and the rib 8D to the other side, so that a plate 5C acts as a rocker or lever on the pivot formed by 5D.

The foregoing describes in effect the arrangement surrounding bearing 2. Bearing 4 is in some respects similar, for example its outer race 4C is also spherically mounted in a ribbed support ring.

The support ring 9 of bearing 4 has radially extending lugs 9A, which bear against the ring 8C of "bearing 2," and has a rib (or series of ribs) 9D corresponding to the rib 8D above mentioned.

Located by a groove in the flank of support ring 8, is a frusto-conical hoop 10, which is cut away to pass the lugs 9A, and which extends outside "bearing 4," having at its rear edge a line-contact nose formation (at 10A) to bear on rocker plates 11 against which the rib 9D also bears. The plates 11 are supported rockably by the shell 6, just as in the corresponding above-described case.

The parts adjacent to the bearing are furnished with oil and air ducts, oil seals (e. g. labyrinths indicated at 12) scavenging arrangements, etc. as may be expedient. These form no part of the invention and so far as they need be understood, are shown in the drawing. The races 2A, 4A, are held by a sleeve 14 forming part of the shafting and screwed tightly up by means not shown. Function is as follows. It will be clear that bearing 2 is operative quite normally as a journal bearing; bearing 4 is in this respect inoperative having no radial support capable of taking any load worth considering. Assume now, a thrust in the shaft 1, towards the left. This is transmitted through two paths which finally unite in the rib 5D. The load passes (in respect of bearing 2) through the following media. From 14 through 4A, 3, 2A, 2B, 2C, 8, 8D, 5C (where it is balanced against the remaining load), 5D, 5B, 5A, to the shell 5 which finally reacts it. In respect of bearing 4 the following is the chain; 14, 4A, 4B, 4C, 9, 9A, 8C, 8A, 8B, 5C (balancing), 5D, 5B, 5A.

When the thrust in the shaft is from left to right, the corresponding chains of transmission apply: In respect of bearing 2, from the step 1A through 2A, 2B, 2C, 8, 10, 10A, to 11 and thus to shell 6. In respect of bearing 4; from the step 1A through 2A, 3, 4A, 4B, 4C, 9, 9D, to 11 and thus to shell 6, the plates 11 again balancing the loads in the respective bearings.

It will be seen that, assuming appropriate dimensioning, the thrust load in each bearing is the same, or if it were required, the leverage in the plates 5C and 11 could be so arranged as to divide the sum of the loads in any required proportions between the bearings 2, 4.

If it were required to transmit very heavy thrust loads, the whole arrangement of the pair of bearings could be duplicated again, through similar balancing devices, for further balanced subdivision of load.

I claim:

1. A journal-thrust bearing assembly, being a bearing assembly in which the journal load is the major load and the thrust load the minor load, comprising two functionally independent ball bearings one of which carries the journal load and both of which transmit thrust load, means to receive and react the total thrust transmitted by the said two bearings, mounting means for the said journal-thrust bearing permitting axial movement of a race thereof relative to said other bearing but restraining it radially and rotationally relative to said reacting means and means associated with said bearings to receive the thrust from each and associated with said reacting means to transmit the sum of such thrusts thereto whilst balancing one against the other.

2. A journal-thrust bearing assembly, being a bearing assembly in which the journal load is the major load and the thrust load the minor load, for a shaft or equivalent comprising two functionally independent ball bearings disposed coaxially on the shaft or equivalent, one of which carries the journal load and both of which transmit thrust load, means to which the shaft is relatively rotatable to receive and react the total thrust transmitted by the said bearings, mounting means for the said journal-thrust bearing permitting axial movement of a race thereof relative to said other bearing but restraining it radially and rotationally relative to said reacting means and circularly disposed means coaxially associated with the said bearings to receive the thrust from each and associated with said reacting means to transmit the sum of such thrusts whilst balancing one against the other.

3. A journal-thrust bearing assembly, being a bearing assembly in which the journal load is the major load and the thrust load the minor load, comprising a first ball bearing to carry the journal load and to transmit part of the thrust load, a second ball bearing to transmit the other part of the thrust load, an element mutually borne by said bearings, supporting means to which the rotation of the said element is relative and by which thrust from said element is to be reacted, mounting means for said first bearing permitting axial movement of a race thereof relative to said second bearing but restraining it radially and rotationally relative to said supporting means, rocker means pivotally associated with said supporting means to transmit thereto thrust loads, means for transmitting thrust from said race to said rocker means with leverage in one direction whereby the individual thrusts are balanced by said rocker means and their sum is transmitted thereby to said supporting means.

4. A journal-thrust bearing assembly, being a bearing assembly in which the journal load is the major load and the thrust load the minor load, comprising a first ball bearing to carry the journal load and to transmit a part of the thrust load, a second ball bearing to transmit the other part of the thrust load arranged coaxially with the first bearing and axially adjacent thereto, an element mutually borne by said bearings, supporting means to which the rotation of said element is relative and by which thrust is to be reacted, mounting means for said first bearing permitting axial movement of a race thereof relative to said second bearing but restraining it radially and rotationally relative to said supporting means, rocker means pivotally associated with said supporting means to transmit thrust loads thereto, means for transmitting thrust from said race to said rocker means with leverage, and means spanning the axial dimension of said first bearing for transmitting thrust from said second bearing to said rocker means with opposite leverage whereby the individual thrusts are balanced by said rocker means and are thereby transmitted as a sum to said supporting means.

5. A double acting thrust bearing assembly comprising a first ball bearing adapted to transmit thrust, a second ball bearing adapted to transmit thrust arranged coaxially with the first bearing and axially adjacent thereto, an element mutually borne by said bearings, supporting means to which the rotation of said element is relative and by which thrust from the said element is to be reacted which means extends axially beyond the pair of bearings both ways outwardly, first and second rocker means pivotally associated with each such outward extension to transmit thrust loads thereto, means for transmitting thrust in one direction from said first bearing with leverage to said first rocker means, means spanning the axial dimension of the said second bearing for transmitting thrust in the opposite direction from said first bearing with leverage to said second rocker means, means spanning the axial dimension of the first bearing for transmitting thrust in one direction from said second bearing with opposite leverage to the first rocker means and means for transmitting thrust in the opposite direction from said second bearing with opposite leverage to the second rocker means whereby the individual thrusts in both directions are balanced by one or other rocker means and are thereby transmitted as a sum to said supporting means.

6. An assembly according to claim 5, in which one of said bearings being adapted to act journalwise is supported radially by said supporting means to transmit journal loads.

7. A thrust bearing assembly comprising a first ball bearing adapted to transmit thrust and having an outer support ring, a second ball bearing adapted to transmit thrust and arranged coaxially with the first and axially adjacent thereto, an element mutually borne by said bearings, supporting structure to which rotation of said element is relative and by which thrust from said element is to be reacted, means to hold the first bearing radially and antirotationally in said structure whilst permitting relative axial freedom, rocker means operatively disposed between said first bearing and said structure and pivotally related to the structure, means to enable said support ring to bear thrustwise on said rocker means with leverage, thrust-transmitting means mounted axially slidable by said support ring to transmit thrust from said second bearing to said rocker means with opposed leverage, and means whereby said support ring anchors the outer race of said second bearing against rotation, the rocker means and their operative connection with both bearings constituting a system to balance their thrusts whilst transmitting the sum thereof to said structure.

8. Assembly according to claim 7, in which said second bearing has a second outer support ring.

9. Assembly according to claim 7, in which said second bearing has a second outer support ring, and both support rings comprise so-called spherical mountings for the outer races of the respective first and second bearings.

10. Assembly according to claim 7, in which said second bearing has a second outer support ring, further comprising a hoop element extending axially from the first bearing support ring across the second support ring whilst engaging said second ring against rotation, and second rocker means disposed operatively between the second bearing and the supporting structure against which the second support ring and the hoop bear thrustwise with leverage to balance thereto from the two bearings and transmit their sum to said structure.

11. Assembly according to claim 7 in which said rocker means comprise rocker plates arranged in circular series concentric with the bearings and pivoted on axes tangentially in relation thereto.

12. A double thrust bearing assembly comprising a shaft, first and second ball bearings axially adjacently mounted thereon and each adapted to transmit thrust, first and second support rings supporting the outer races of said bearings in spherical manner, a supporting structure to react thrust from said shaft which is rotatable relative thereto such structure extending axially beyond the pair of bearings and enshrouding them, two circular series of rocker plates pivotally supported within and by said structure outside said bearings each series to transmit thrust from the bearings to the structure in one axial sense of direction, means whereby each outer ring transmits thrust from its respective bearing to each series in one axial sense and to the other series in the opposite axial sense, such transmitting means being operatively related to the rocker means in such a way as to balance the thrusts from the two bearings in such rocker means whilst the sum of such thrusts is transmitted through the pivoted supports to said structure.

13. Assembly according to claim 12, in which are further comprised radial splines between one of said support rings and said structure to support the respective bearing radially whilst permitting relative axial freedom.

14. Assembly according to claim 12, in which one of said supporting rings in engaged with the other against relative rotation, the said other ring being engaged with said supporting structure against rotation.

RODERICK CRISTALL McLEOD.

REFERENCES CITED

The following references are of record in the file of this patent:

UNITED STATES PATENTS

| Number | Name | Date |
|---|---|---|
| 1,421,082 | Hall | June 27, 1922 |
| 1,734,223 | Melott | Nov. 5, 1929 |